Nov. 10, 1925.                                                 1,560,609
E. H. SHERBONDY
DRIVING MECHANISM
Filed Feb. 7, 1924                           2 Sheets-Sheet 1

Inventor
Earl H. Sherbondy
by Popp & Powers
Attorneys

Nov. 10, 1925.          1,560,609
E. H. SHERBONDY
DRIVING MECHANISM
Filed Feb. 7, 1924      2 Sheets-Sheet 2

Inventor
Earl H. Sherbondy
by Paul & Powers
Attorneys

Patented Nov. 10, 1925.

1,560,609

UNITED STATES PATENT OFFICE.

EARL H. SHERBONDY, OF CLEVELAND, OHIO, ASSIGNOR TO CHARLES A. CRIQUI, OF BUFFALO, NEW YORK.

DRIVING MECHANISM.

Application filed February 7, 1924. Serial No. 691,084.

*To all whom it may concern:*

Be it known that I, EARL H. SHERBONDY, a citizen of the United States, residing at Cleveland, in the county of Cuyahoga and State of Ohio, have invented a new and useful Improvement in Driving Mechanism, of which the following is a specification.

This invention relates to a driving mechanism which is more particularly designed for operating two horizontal cam shafts of a gas engine from a vertical intermediate shaft which latter is operatively connected with the crank shaft of the engine, but this driving mechanism is also useful in other installations where similar conditions exist.

In gas engines equipped with a plurality of cam shafts it has heretofore been the custom to employ spiral gear wheels or large spur gear wheels which are objectionable on account of the amount of room which they occupy and also because of their size the same expand and contract unduly in response to changes in temperature and also produce an undue amount of noise and wear quite rapidly.

It is the object of this invention to provide a driving mechanism between the intermediate upright or driving shaft of a gas engine and the driven or horizontal, intermediate shafts or similar installations, in which spiral gears and large spur gears are eliminated, and instead bevel gears and herringbone gears are employed which are so organized that they produce a very compact construction, which can be housed in such manner that the driving mechanism as a whole forms a complete unit which entirely encloses the gears and permits of utilizing a pressure oil feed for lubricating the bearings and flooding out the gearing or directly injecting oil by pressure on to the gears.

A further object of this invention is to provide a gearing which is very compact and in which the several gears are all of a small size so as to reduce to a minimum the variation in gear engagement when the same expand and contract in response to temperature changes, thereby reducing the noise which would otherwise be produced and also reducing the wear on the same to a practically imperceptible extent.

In the accompanying drawings.

Similar characters of reference refer to like parts in the several figures.

The numeral 10 represents an upright intermediate or driving shaft which is adapted to be operatively connected at its lower end with a crank shaft of the engine so as to be turned thereby in any suitable and approved manner.

Figure 1:
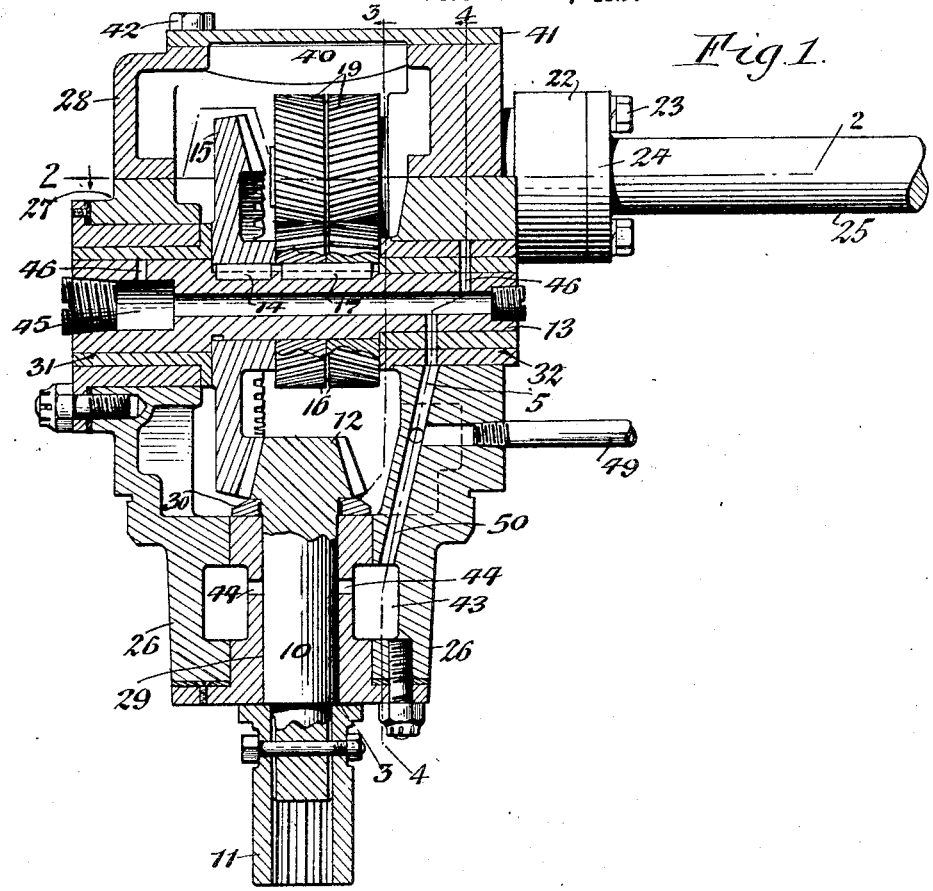
Figure 1 is a longitudinal section of a driving mechanism embodying one form of my invention which is suitable for transmitting motion from the crank shaft of an engine to the valve mechanism.

As shown in Figure 1 the lower end of this shaft is provided with a coupling sleeve 11 whereby the same is detachably connected with the upper end of the shaft extension or other suitable means for transmitting power thereto from the crank shaft of the engine. At its upper end this intermediate driving shaft is provided with a small bevel gear wheel or pinion 12. Arranged across the upper end of the driving shaft 10 and pinion 12 is a horizontal counter shaft 13 upon which is mounted by means of a key 14 or otherwise, a driven large bevel gear wheel 15, the lower part of which meshes with one side of the driving gear pinion 12.

Immediately above the pinion 12 and opposite the face of the large gear wheel 15 is an intermediate driving gear wheel 16, preferably of the herringbone type, which is mounted on the counter shaft by means of a spline 17 or other suitable means.

Arranged on a plane above the axis of the counter shaft are two horizontal driven shafts 18, 18 which are parallel with the counter shaft and provided at their inner ends, respectively, with gear wheels 19 of herringbone type which mesh with the upper part of the driving gear wheel 16 on opposite sides of a vertical line passing through the axis of the latter, these driven herringbone gears being mounted on their respective shafts by means of keys 21, as shown in sections 2 and 3 or in any other suitable manner.

At the outer ends of these driven shafts, the same are provided, respectively, with coupling flanges 22 which are adapted to be connected by bolts 23 or the like with flanges 24 on the adjacent ends of the cam shafts 25. The latter extend lengthwise of the upper part of the gas engine and are provided with the usual cams, by means of which the valves of the gas engine are operated so as to control the admission of fuel thereto and the exhaust gases therefrom in a manner well-known in the art. Enclosing the several gears of this driving mechanism is a housing or casing which is preferably constructed in three sections, the bottom part of the lower section 26, an intermediate section 27 and an upper section 28. The lower section is provided with an upright bearing 29 in which the intermediate driving shaft 10 is journaled immediately below its driving pinion 12, this shaft being held against vertical motion by engagement of the coupling sleeve 11 with the lower end of this bearing and the interposition of a thrust ring or collar 30 between the underside of the driving pinion 12 and the upper end of the bearing 29.

Figure 4:
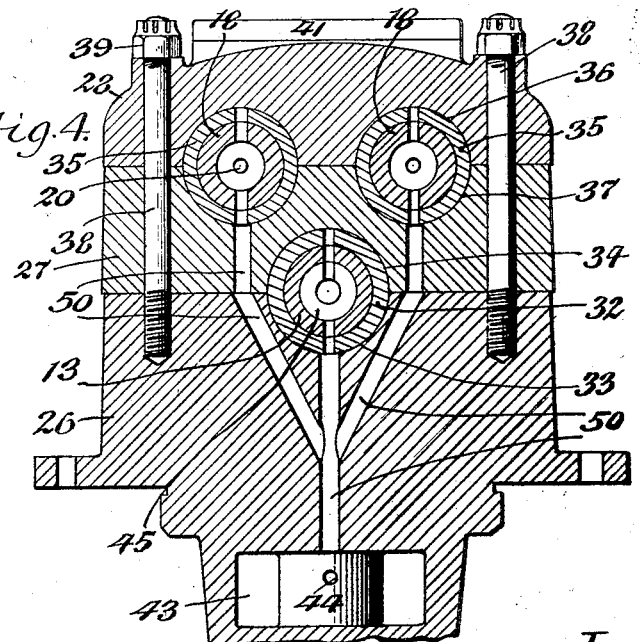

On the opposite upright side walls of the casing are mounted two horizontal bearings 31, 32 in which are journaled the opposite ends of the counter shaft 13, these bearings being secured in the semi-cylindrical recesses 33, 34 formed in the opposing surfaces of the joint between the lower and intermediate sections of the housing which engage with opposite sides of these horizontal bearings and a joint between which is arranged horizontally and on a plane extending through the axis of the counter shaft, as best shown in Figure 4.

The driven shafts are journaled between their driven gear wheels and the coupling flanges 22 thereon in horizontal bearings 35 which are mounted on one upright side or wall only of the housing, preferably the wall thereof opposite to that which is engaged by the large bevel gear wheel 15. These bearings 35 engage with their upper and lower parts in semi-cylindrical recesses 36, 37 formed in the opposing surfaces of the upper and lower casing sections 28 and 27, which surfaces engage with each other adjacent to these bearings and form a horizontal joint therebetween which is on a horizontal plane arranged above the axis of the counter shaft and extends through the axes of the driving shafts.

The several sections of the housing are detachably connected with each other so that the same can be readily assembled and dismembered for inspection, adjustment and repairs for which purpose a plurality of tie rods or bolts 38 are provided which preferably extend vertically through these sections adjacent to the periphery thereof and engage their lower threaded ends with corresponding threads on the lower housing section, while the nuts 39 on the upper ends of these tie rods or bolts engage with the top of the uppermost section of the housing, as best shown in Figure 4.

In order to permit of inspecting the interior of the housing without disturbing the driving mechanism, this housing is preferably provided in its top with an opening 40 which is normally closed by means of a cover or plate 41 secured to the upper housing section by means of screws 42 or the like.

Figure 2:
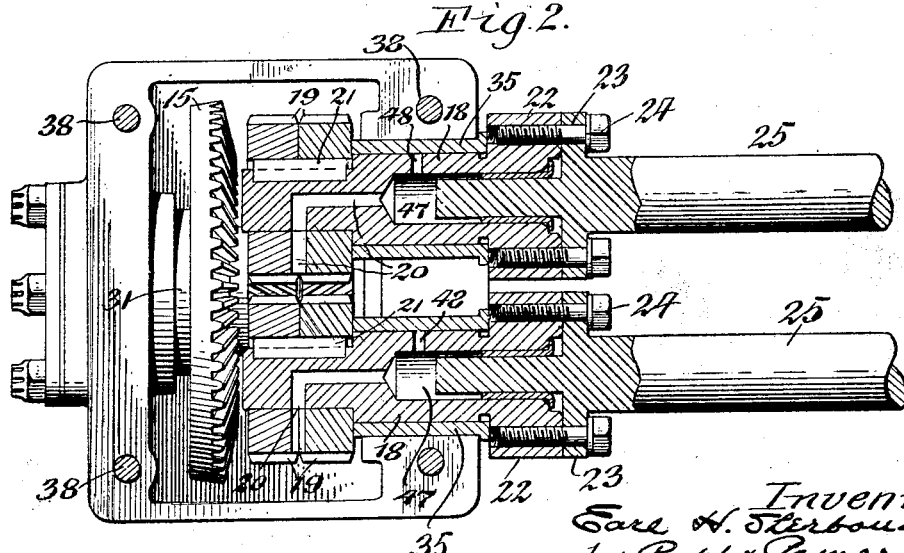
Figure 2 is a horizotal section taken on line 2, 2 Figure 1.
Figure 3:
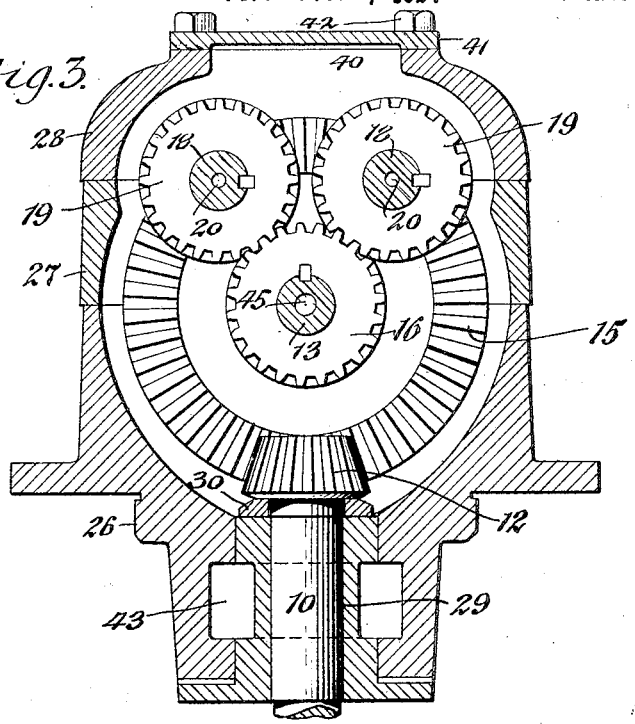
Figures 3 and 4 are vertical transverse sections taken on the correspondingly numbered lines in Figure 1.

For the purpose of lubricating the several bearings of the driving mechanism, an oil well 43 is formed with a lower housing section and around the lower bearing 29 and provided with oil delivery ducts 44 leading from the well to the bore of this bearing. The counter shaft is provided with a longitudinal well 45 having ducts 46 leading therefrom to the periphery of this shaft, and each of the driven shafts 18, 18 is provided with a longitudinal well 47 having ducts 48 leading therefrom to the periphery of these shafts. Oil may be supplied under pressure to these several wells for the purpose of lubricating the cooperating bearing surfaces between these bearings and the shafts journaled therein, this being accomplished for instance, through the medium of a supply pipe 49 which receives a supply of lubricant under pressure from any suitable source and delivers the same to distributing conduits 50 formed in the lower and intermediate housing sections and leading to the well 43 of the lower bearing and the ducts 46 and 48 of the counter shaft bearings and the driving shaft bearings, as shown in Figures 1 and 4. In order to supply oil to the teeth of the gear wheels and also to flood the interior of the housing so as to cause the gears to be lubricated and run noiselessly, means are provided for connecting the interior of the housing with the oil supply conduits which is preferably accomplished by providing discharge ducts 20 leading from the oil wells in the driven shafts to the peripheries of the driven herringbone gear wheels, as shown in Figure 2.

When necessary the top section of the housing may be removed for the purpose of exposing the gearing and the bearings of the driven shafts which connect with the cam shafts, without disturbing the line-up of the gearing. If further dismembering of the parts is necessary, the driving shafts and the cam shafts may be removed together with their bearings and driven herringbone gears from between the upper and intermediate housing sections, and thereby expose the counter shaft and its bearings and permit of a thorough examination of the same without in any way disturbing the alignment or adjustment of the bevel gearing between the driving shaft and the counter shaft. It must be apparent that this driving mechanism is freely accessible for adjustment, inspection and repairs without necessitating undue dismemberment of the same, and thereby avoiding unnecessary interruption in the operation of the engine for work of this character.

By employing gearings of the character described and organizing the same in the manner shown, a very compact structure is produced which can be readily built in the form of a complete unit in which the gearing is entirely enclosed and capable of being easily installed without disturbing the adjustment of any of its parts after the unit has been once assembled. The employment of herringbone gears and bevel gears is particularly well suited for use in engines which are intended to run at comparatively high speed and for comparatively long stretches of time, inasmuch as the bevel and spiral gears are of smaller diameter than those capable of being used heretofore, and therefore reduce to a minimum the variation in the gear engagement which necessarily follows the expansion and contraction of the same during temperature changes which reduced variation, also modifies the noise which otherwise would be produced to the greatest extent and also reduces the wear on these gears so that the same is not of any particular consequence.

Moreover, the building of this driving mechanism as a complete unit which is entirely enclosed permits the use of pressure feed lubrication to the bearings and also flooding out of the gearing, as well as enabling a direct injection of oil under pressure to be effected on the gears within the casing.

Although this driving mechanism has been described above as being particularly well suited for use in gas engines having a plurality of cam shafts, it obviously can be used advantageously elsewhere in which there is need for driving a plurality of shafts from a wheel driving shaft and compactness, absence of noise and reduction in wear are desirable.

I claim as my invention:

1. A driving mechanism comprising a driving shaft, an intermediate counter shaft arranged at right angles to said driving shaft, intermeshing gear wheels mounted respectively on said driving and counter shafts, a plurality of driven shafts arranged parallel with said counter shaft, a driving gear wheel mounted on said counter shaft, driven gear wheels arranged respectively on said driven shafts and meshing with said driving gear wheel, and a housing enclosing said gear wheels and provided with bearings in which said shafts are journaled, and said housing being divided on a plane extending through the axis of said counter shaft.

2. A driving mechanism comprising a driving shaft, an intermediate counter shaft arranged at right angles to said driving shaft, intermeshing gear wheels mounted respectively on said driving and counter shafts, a plurality of driven shafts arranged parallel with said counter shaft, a driving gear wheel mounted on said counter shaft, driven gear wheels arranged respectively on said driven shafts and meshing with said driving gear wheel, and a housing enclosing said gear wheels and provided with bearings in which said shafts are journaled, and said housing being divided on a plane extending through the axis of said counter shaft and on a plane extending through said driven shafts.

In testimony whereof I affix my signature.

EARL H. SHERBONDY.